UNITED STATES PATENT OFFICE.

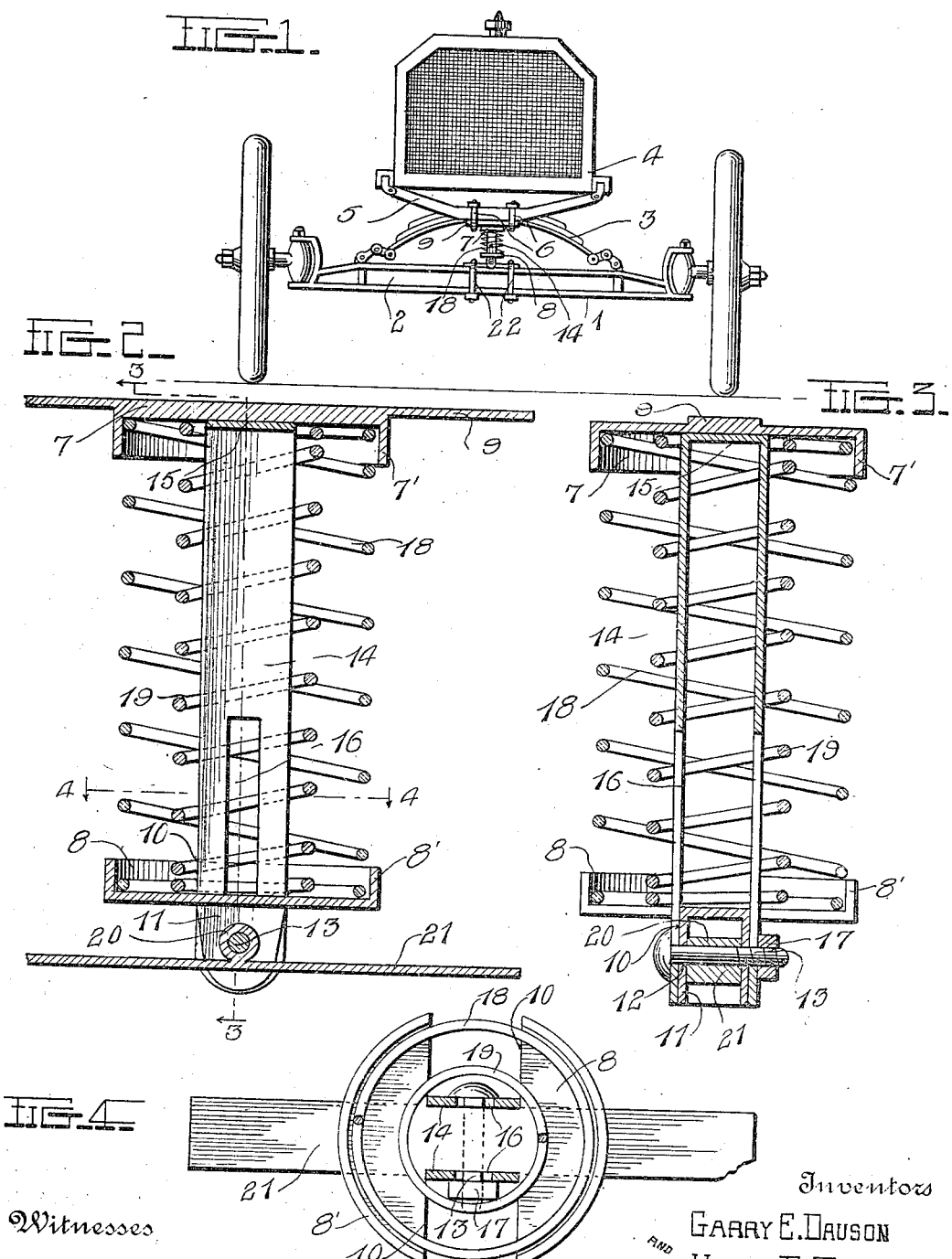

GARRY E. DAUSON AND HARRY B. TAYLOR, OF SACO, MONTANA.

VEHICLE SHOCK-ABSORBER.

1,188,738.  Specification of Letters Patent.  Patented June 27, 1916.

Application filed February 7, 1916. Serial No. 76,740.

*To all whom it may concern:*

Be it known that we, GARRY E. DAUSON and HARRY B. TAYLOR, citizens of the United States, residing at Saco, in the county of Phillips and State of Montana, have invented certain new and useful Improvements in Vehicle Shock-Absorbers; and we do declare the following to be a full, clear, and exact description of the invention, such as will enable others skilled in the art to which it appertains to make and use the same.

This invention relates to improvements in shock absorbers particularly those which are adapted to be used on automobiles.

The principal object of the invention is to provide a simply constructed device of this character which can be inexpensively manufactured, yet which will be extremely efficient in operation.

With this general object in view, our invention resides in certain novel features of construction, and the combination and arrangement of parts which will hereinafter be more particularly described and claimed and shown in the drawings wherein:

Figure 1 represents a front elevation of a portion of an automobile showing the application of our invention thereto; Fig. 2 is a central vertical section of the shock absorber removed from the vehicle; Fig. 3 is a similar view but taken on a plane at right angles to the plane of the section in Fig. 2; and Fig. 4 is a transverse section taken on the line 4—4 of Fig. 2.

This improved shock absorber is particularly adapted for use on that type of automobiles known as the "Ford".

In the accompanying drawing, the numeral 1 designates broadly the chassis of the automobile, 2 represents the front axle, and 3 the transverse spring which supports the front end of the body 4. The spring 3 is secured to the radiator support 5 by means of a pair of substantially U-shaped clips 6.

Our improved absorber is designed to be disposed between the highest point of the spring 3 and the axle 2 as shown in the drawing.

In carrying out this invention, we provide a pair of vertically spaced cup members 7 and 8, the member 7 having laterally extending arms 9 projecting from diametrically opposite points on its periphery. As shown, the first mentioned cup member 7 is inverted, the arms 9 being secured to the upper surface, they being either formed integrally therewith or secured thereto by any preferred means. The other cup member 8 is disposed beneath the member 7 and is provided with diametrically disposed notches 10, the material cut from these notches being preferably bent downwardly to provide pair of alined ears 11 apertured as shown at 12 to receive a pivot bolt 13. These notches 10 are of a width slightly greater than the width of a pair of leg members 14 which depend from the cup member 7. These leg members 14 are preferably formed of one piece of sheet metal bent into inverted U form, the crown 15 thereof being secured to the inner surface of the member 7, while their free ends are slidably received in the notches 10 and disposed on the outside of the ears 11. The free ends of these leg members are also provided with longitudinal slots 16 through which the pivot bolt 13 extends, thereby slidably connecting the cup member 8 thereto. The slots 16 are of less width than the diameter of the head of the pivot bolt 13 or the nut 17 on the threaded end thereof, thus the parts will be reliably held in operative position.

A helical expansion spring 18 is disposed around said leg members 14, its ends resting in the cup members 7 and 8 and retained in position by the flanges 7' and 8' respectively. The diameter of this spring is preferably of the inner diameter of said cup members. An additional helical expansion spring 19 of less diameter than the spring 18 is disposed between the same and said leg members, and as it closely surrounds said leg members, it will be reliably held in correct position. From this description, it will be seen that the springs will limit the movement between the cup members and tend to hold them in their extended positions.

The pivot bolt 13 is also surrounded by a bearing sleeve 20 disposed between said ears 11 which bearing sleeve is integrally formed with or otherwise secured to a bar 21. This bar is of a width substantially equal to that of the width of the axle 2 of the automobile and is held thereto when the absorber is in its operative position upon the vehicle by means of a pair of U-shaped clips 22, one of said clips surrounding the bar on each side of the sleeve 20 which is preferably disposed in its center. The arms 9 of the other cup member 7 are secured to the spring 3 by means of the clips 6 hereinbefore mentioned, thus the upper member 7 will be rigidly secured to the vehicle; while the lower member 8 will be pivotally connected thereto because of the hinge connected between said bar 21 and the ears 11. This arrangement is clearly illustrated in Fig. 1. From an examination of this figure in connection with the preceding description, it will be seen that we have invented a very simple, yet obviously efficient shock absorber which with very slight changes can be used on various types of automobiles. It is readily evident that when the vehicle to which it is applied runs over rough roads, the body of the vehicle will move downwardly thus compressing the expansion springs and moving the upper cup member toward the lower, the free ends of the leg members 14 straddling the axle, thus eliminating considerable jar.

We claim as our invention:

1. The combination with a vehicle, of a pair of vertically spaced cup members, arms projecting from one of said members, said arms being rigidly secured to the vehicle spring, the other member being pivotally connected to the vehicle axle, a pair of leg members fixed to the upper cup member and slidable through the other, said leg members straddling said axle, and a helical expansion spring interposed between said cup members.

2. A device of the class described comprising a pair of vertically spaced cup members, a pair of leg members secured to one of said cup members, the free ends thereof being slotted, the other of said cup members being slidably connected with said slotted ends, arms extending from one of said cup members to secure the same to a vehicle, a bar pivotally secured to the slidable cup member to fix said member to the vehicle, and a helical expansion spring interposed between said cup members.

3. A device of the class described comprising a cup member having laterally extending arms for rigidly securing the same to a vehicle, an additional cup member vertically spaced from the other member, a pair of leg members secured to the first mentioned cup member, their free ends being longitudinally slotted, the other cup member being notched to receive said slotted free ends, ears on said last mentioned cup member between the free ends of said leg members, a pivot bolt extending through said ears and said slots to slidably attach the cup member to said leg members, and a bar having a bearing sleeve surrounding said bolt, said bar being adapted to be secured to the vehicle.

In testimony whereof we have hereunto set our hands in presence of two subscribing witnesses.

GARRY E. DAUSON.
HARRY B. TAYLOR.

Witnesses:
VIRGIL J. HARRIS,
L. V. HAWVER.